3,395,527
YARN AND FABRIC MADE THEREFROM
Harold Longley, Cleckheaton, England, assignor to Scandura Incorporated, Portland, Maine, a corporation of Maine
Filed June 21, 1965, Ser. No. 465,616
Claims priority, application Great Britain, June 23, 1964, 25,873/64
14 Claims. (Cl. 57—140)

ABSTRACT OF THE DISCLOSURE

A composite yarn having a fibrous asbestos strand intertwisted with a short staple glass fibre strand in such a manner that the predominant surface texture of the composite is provided by the glass fibre strand and is fluffy.

---

The present invention relates to yarns, the composition of which includes glass fibres and asbestos fibres, and also to fabric made therefrom which fabric is suitable for use as filter cloth in the filtration of dust laden gases.

In the filtration of streams of dust laden gases it has heretofore been the common practice to use cotton fabrics as the filtering medium. The mesh of the cotton fabric acts to separate the solid particles from the stream of gas. It is frequently desirable to filter out dust particles from gases which are at a temperature in excess of 150° C. and at these temperatures cotton fabric filters rapidly lose their strength. Also cotton fabrics have poor resistance to acid gases which are often produced in many chemical and combustion processes.

It is seen that cotton fabrics are unsuitable for many applications and heretofore high temperature dust laden gases have been filtered by using fabrics made from either glass fibre or asbestos fibre. There are certain requirements other than those aforementioned which a fabric must meet if it is to be suitable for use as a filter cloth. The fabric must have openings which are below a certain maximum size in order to prevent particles larger than a given size from passing through the filter, thus providing the filter with good filtering efficiency. There must also be a sufficient number of openings per unit area in order to make the fabric sufficiently porous to provide a low resistance to fluid flow. It is also necessary that the filter cloth should have a high mechanical strength as in operation the cloth may be intermittently shaken, or may be rubbed or brushed or submitted to the action of an air jet, to remove the accumulation of dust particles therefrom.

It is found that asbestos fibre fabrics, unless they are woven of such open structure as to be inefficient as filters, have a high resistance to fluid flow and asbestos yarns with a continuous filament glass fibre carrier thread have a high tensile strength but when woven into fabric have the same disadvantages as asbestos.

It is therefore an object of the present invention to provide a composite yarn comprising staple glass fibres and asbestos fibres and which yarn has good mechanical strength and flexibility and may be made up into a fabric with good filtering efficiency, and low resistance to fluid flow.

According to the present invention there is provided a composite yarn comprising an asbestos component combined with staple glass fibre.

The asbestos component can be in the form an asbestos sliver, roving or yarn which is spun or doubled with the staple glass fibre. The staple glass fibre can be in the form of a staple glass fibre sliver or low twist yarn. The asbestos component may, if desired, incorporate a suitable core member, for example a yarn of suitable material or a wire, to give mechanical strength or other physical or chemical properties to the composite yarn.

Further according to the present invention there is provided a fabric made from or incorporating composite yarn as above provided for. In cases where the composite yarn is only used partly in making the fabric, for example in the warp or in the weft, other types of yarn or wire can be used in the remainder of the fabric.

By the term staple glass fibre sliver as used herein and in the appendant claims we mean a twistless assembly of staple glass fibres produced in the form of a continuous strand.

By the term low twist staple glass fibre yarn, as used herein and in the appendant claims, we mean a loosely spun yarn made from a sliver by inserting a twist of less than 2× counts per inch where the counts are taken on the glass system. Preferably the twist in turns per inch is approximately equal to the square root of the counts. The glass system referred to is defined as:

$$\text{Counts} = \frac{\text{Yards per lb.}}{100}$$

Whereas the standard asbestos system is defined as:

$$\text{Counts} = \frac{\text{Yards per lb.}}{50}$$

The asbestos component may be surface treated with silicone resins or dispersions of polytetrafluoroethylene or phenol resins or melamine resins before it is combined with the staple glass fibre. The surface treatment of the asbestos component is to improve the abrasion resistance or acid resistance, or to modify surface friction, or flexibility and strength in the finished woven fabric.

The composite yarn according to the present invention, presents characteristics which are the opposite of the normal asbestos yarn spun with a continuous glass fibre yarn. In the latter the glass fibre yarn provides a relatively straight yarn and the asbestos fibre provides a fibrous surround. In the yarn according to the present invention the asbestos component may be spun with a staple glass fibre yarn or sliver, or the asbestos component may be doubled with the glass yarn or sliver. In either case the composite yarn will have a hairy surface due to the protusion of the many filament ends from the glass fibre staple. When the composite yarn is made up into the fabric these hairy protrusions effectively fill the holes in the fabric with a fibrous mass. It is this fibrous mass which improves the filtering qualities of the fabric. Because the glass fibres are coarser and more resilient than asbestos fibres they do not pack so tightly and they thus provide a fabric having a higher and more uniform porosity.

In order that the invention may be more clearly understood and carried into effect several embodiments thereof will now be described, by way of example only, and with reference to the accompanying diagrammatic drawings in which.

Figure 1:
FIG. 1 illustrates a composite yarn made according to the present invention and shows the hairy protrusions.
Figure 2:
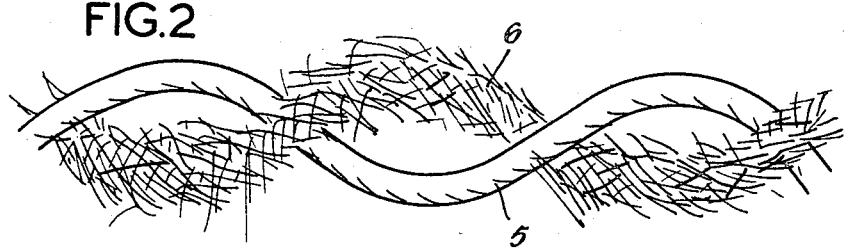
FIG. 2 illustrates a composite yarn in which the spacings have been greatly exaggerated to show its make-up.
Figure 3:
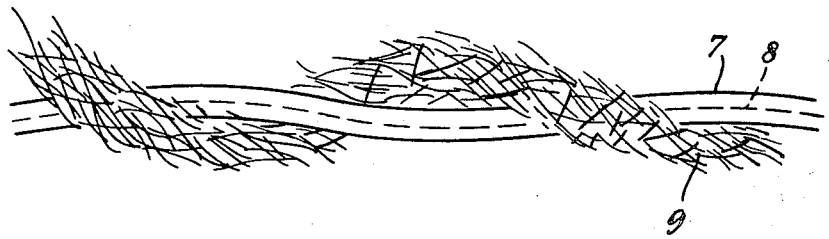
FIGS. 3 and 4 illustrate composite yarns in which the asbestos components are provided with a reinforcing core member.

In FIG. 2 the composite yarn is made by doubling an asbestos yarn 5 with a lowtwist staple glass fibre yarn 6. Referring now to FIG. 3 the composite yarn is made by spinning an asbestos yarn 7 reinforced by a core member in the form of a wire 8 with a sliver of staple glass fibre 9. The asbestos yarn 7 is spun with the stainless steel wire 8 and the staple glass fibre sliver 9 is then spun with the wire reinforced asbestos yarn.

Figure 4:
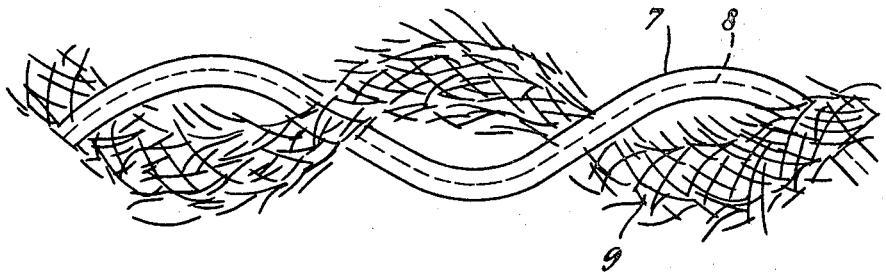

FIG. 4 shows the composite yarn made by doubling an asbestos yarn 7 reinforced by a core member in the form of a wire 8 with a sliver of staple glass fibre 9.

Figure 5:
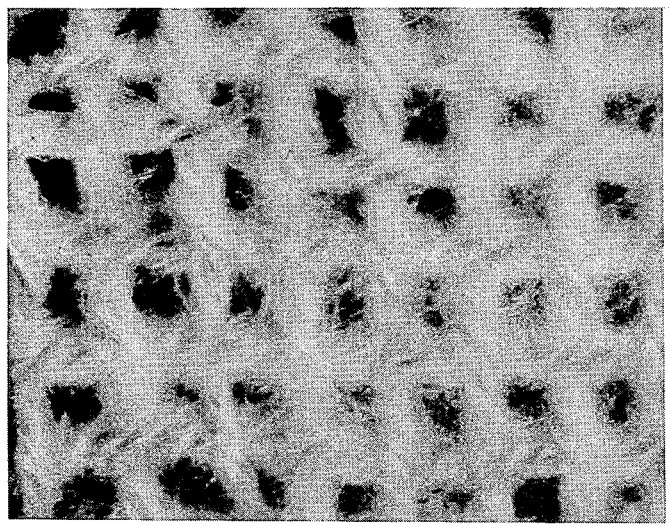
FIG. 5 illustrates a fabric according to the present invention in which the composite yarn is shown woven more openly than is usual in practice.

In FIG. 5 which illustrates a loosely woven sample of fabric made from composite yarn according to the present invention, the fibrous nature of the yarn is clearly visible.

Figure 6:
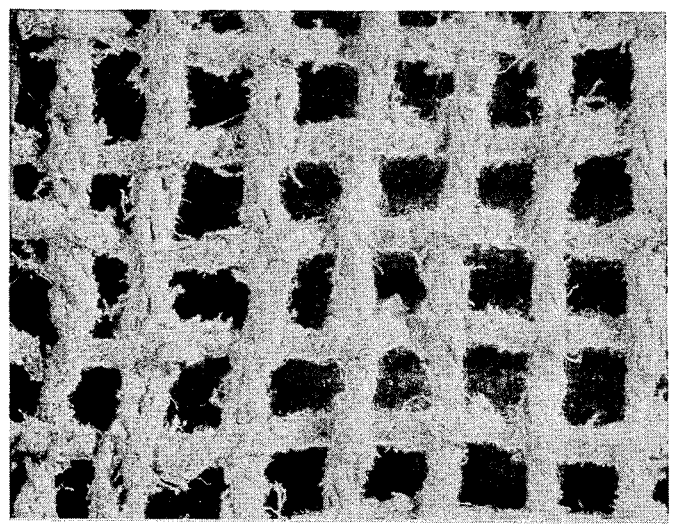
FIG. 6 illustrates a well known fabric made from asbestos yarn in a similar weave to that shown in FIG. 5.

FIG. 6 shows a sample of well known fabric as woven from asbestos yarn. The holes in the fabric in FIG. 5 are filled far more effectively by the glass fibres of the composite yarn than are the holes in the fabric of FIG. 6. Thus the fabric woven from the composite yarn provides a more efficient filtering medium than does the asbestos fabric.

Four types of filter fabric which may be made to incorporate the composite asbestos glass fibre yarn will now be given by way of example only:

Example 1

In this example the composite asbestos glass fibre yarn is used in both the warp and the weft.

The asbestos yarn is made from normal single 40s (asbestos counts) asbestos yarn with 14 turns per inch ("Z" twist). The glass fibre yarn is 10s (glass counts) staple glass fibre with 3.2 turns per inch "Z" twist. The asbestos yarn and glass fibre yarn are doubled together on a standard flyer or ring doubling frame with 2.8 turns per inch "S" twist.

In weaving the fabric the same composite yarn is used in both warp and weft. The fabric is woven in a 2/2 twill weave with 20 ends per inch warp and 10 picks per inch weft. The finished fabric weighs 32 oz. per sq. yarn and has an air permeability of 80 cu. ft./sq. ft./min. per ½ inch water gauge pressure difference.

Example 2

In this example the warp threads are reinforced with stainless steel wire.

The warp thread is made by core spinning single 32s (asbestos counts) asbestos yarn with 38 (standard wire gauge) stainless steel wire. The asbestos yarn has 10 turns per inch ("S" twist) when twisted with the wire.

The sliver of single 10s (glass counts) staple glass fibre and wire reinforced asbestos yarn are then spun together with 3.2 turns per inch ("Z" twist), the asbestos yarn being held under tension to ensure it is located in the centre of the composite yarn.

In the weft the asbestos yarn is made from normal single 40s (asbestos counts) asbestos yarn with 14 turns per inch ("Z" twist). The staple glass fibre yarn is 10s (glass counts) staple glass fibre with 3.2 turns per inch "Z" twist. The asbestos yarn and glass fibre yarn are doubled together with 2.8 doubling turns per inch ("S" twist).

The fabric is a 2/2 twill weave with 16 ends per inch warp and 14 picks per inch weft. The fabric weighs 35 oz. per sq. yard and has a porosity of 54 cubic ft./sq. ft./min. per ½ inch water gauge pressure difference.

Example 3

In this example the warp is made from the composite asbestos glass fibre yarn and the weft is made from asbestos yarn only.

The asbestos core yarn is normal single 40s (asbestos counts) asbestos yarn and is doubled with single 10s (glass counts) staple glass fibre yarn.

The glass fibre yarn has 3.2 turns per inch "Z" twist and the asbestos has 14 turns per inch "Z" twist. The asbestos and glass fibre are double together with 2.8 doubling turns per inch "S" twist.

The weft is made by doubling two single 40s (asbestos counts) asbestos yarns together, each yarn having 14 turns per inch ("Z" twist). The doubled yarn has 9.8 doubling turns per inch ("S" twist).

In the woven fabric there are 18 ends per inch warp and 18 picks per inch weft and the weave employed is a 2/2 twill weave.

The finished fabric weighs 31 oz./sq. yard and has a porosity of 42 cu. ft./sq. ft./min. per ½ inch water gauge pressure difference.

Example 4

In this example the warp is made from the composite asbestos glass fibre yarn and the weft is made from staple glass fibre only.

The warp is made from single 10s (glass counts) staple glass fibre yarn core spun with single 32s (asbestos counts) asbestos yarn. The core yarn of asbestos has 12 turns per inch ("S" twist) and the composite yarn has 3.2 turns per inch ("Z" twist).

The weft is made by doubling two single 10s (glass counts) staple glass fibre yarns together each yarn having 3.2 turns per inch ("Z" twist). The doubled yarn has 2.8 doubling turns per inch ("S" twist).

In the woven fabric there are 18 ends per inch warp and 12 picks per inch weft and the weave employed is a 3/1 twill weave.

The finished fabric weighs 33 oz./sq. yard and has a porosity of 40 cu.ft./sq.ft./min. per ½ inch water gauge pressure difference.

It is to be realised that the present invention is not confined to the above examples, other weaves may be used and the fabrics may be knitted or made by other textile processes.

I claim:

1. A composite yarn comprising an asbestos strand intertwisted with a glass fibre strand, said glass fibre strand providing the predominant surface texture of the composite yarn; the glass fibre strand being constituted by relatively short staple filaments which provide a fluffy surface caused by projecting ends of said filaments.

2. A yarn as claimed in claim 1, wherein the glass fibre strand is spun or doubled with the asbestos strand.

3. A yarn as claimed in claim 1, wherein the glass fibre strand is in the form of a staple glass fibre sliver.

4. A yarn as claimed in claim 1, wherein the glass fibre strand is in the form of a low twist staple glass fibre yarn.

5. A yarn as claimed in claim 1, wherein the asbestos strand is in the form of an asbestos sliver or roving.

6. A yarn as claimed in claim 1, wherein the asbestos strand is in the form of an asbestos yarn.

7. A yarn as claimed in claim 1, wherein the asbestos strand incorporates a core member.

8. A yarn as claimed in claim 7, wherein the core member is stainless steel wire.

9. A yarn as claimed in claim 1, wherein the asbestos strand has been treated with an agent selected from the group consisting of polytetrafluoroethylene dispersions, melamine resins, phenolic resins and silicone resins.

10. A yarn as claimed in claim 1, wherein the asbestos strand has been treated with a polytetrafluoroethylene dispersion.

11. A yarn as claimed in claim 1, wherein the asbestos strand has been treated with a melamine resin.

12. A yarn as claimed in claim 1, wherein the asbestos strand has been treated with phenolic resin.

13. A yarn as claimed in claim 1, wherein the asbestos strand is treated with silicone resin.

14. A woven fabric wherein the yarn disposed parallel to one axis of the fabric is a composite yarn comprising an asbestos strand intertwisted with a glass fibre strand, said glass fibre strand providing the predominant surface texture of the composite yarn; the glass fibre strand being constituted by relatively short staple filaments which provide a fluffy surface caused by projecting ends of said filaments.

References Cited

UNITED STATES PATENTS

| | | | |
|---|---|---|---|
| 2,132,702 | 10/1938 | Simpson | 57—153 |
| 2,210,290 | 8/1940 | Heinohn | 139—420 |
| 2,350,504 | 6/1944 | Geier et al. | 57—139 |
| 2,712,509 | 7/1955 | Biefeld | 57—140 |
| 2,729,933 | 1/1956 | Crawford | 57—140 |
| 2,886,877 | 5/1959 | Frickert et al. | 57—140 XR |
| 2,951,277 | 9/1960 | Young | 57—140 XR |
| 3,066,383 | 12/1962 | Marzocchi | 57—140 |
| 3,159,187 | 12/1964 | Barnett | 57—140 XR |
| 763,377 | 6/1904 | Drury | 57—144 |
| 2,120,270 | 6/1938 | Tucker | 57—144 XR |
| 2,144,868 | 1/1939 | Bent | 57—144 XR |
| 2,179,087 | 11/1939 | Gibbons | 57—144 |
| 2,217,049 | 10/1940 | Greenleaf | 57—144 |
| 2,311,356 | 2/1943 | Astley | 57—144 |
| 2,475,083 | 7/1949 | Davis. | |
| 2,503,237 | 4/1950 | Palm et al. | 57—144 |

FRANK J. COHEN, *Primary Examiner.*

D. E. WATKINS, *Assistant Examiner.*